United States Patent
Husberg et al.

(10) Patent No.: US 10,759,272 B2
(45) Date of Patent: Sep. 1, 2020

(54) TANK CLOSURE

(71) Applicant: Hella GmbH & Co. KGaA, Lippstadt (DE)

(72) Inventors: Olaf Husberg, Warburg (DE); Henning Irle, Lippstadt (DE); Ingo Niemeyer, Moehnesee (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 40 days.

(21) Appl. No.: 16/135,521

(22) Filed: Sep. 19, 2018

(65) Prior Publication Data

US 2019/0084413 A1 Mar. 21, 2019

(30) Foreign Application Priority Data

Sep. 19, 2017 (DE) .......... 10 2017 121 690

(51) Int. Cl.
  *B60K 15/04* (2006.01)
  *B60K 15/05* (2006.01)

(52) U.S. Cl.
  CPC .......... *B60K 15/0406* (2013.01); *B60K 15/05* (2013.01); *B60K 2015/0422* (2013.01); *B60K 2015/0425* (2013.01); *B60K 2015/0451* (2013.01); *B60K 2015/053* (2013.01);
  (Continued)

(58) Field of Classification Search
  CPC ................ B60K 15/0406; B60K 15/05; B60K 2015/0422; B60K 2015/0425; B60K 2015/0451; B60K 2015/0507; B60K 2015/053; B60K 2015/0538;
  (Continued)

(56) References Cited

U.S. PATENT DOCUMENTS 5,234,122 A    8/1993   Cherng
5,275,213 A *   1/1994   Perkins ................ B60K 15/035
                                                141/286
(Continued)

FOREIGN PATENT DOCUMENTS

DE           19846498 A1    4/2000
DE     202004013094 U1   1/2006
(Continued)

OTHER PUBLICATIONS

Extract from 'Spiegel Online' (www.spieciel.de/auto/werkstatt/neuer-tankverschluss-wie-in-der-boxengasse-a-216770.html), Oct. 7, 2002, "Neuer Tankverschluss Wie in der Boxengasse".

(Continued)

*Primary Examiner* — Jessica Cahill
*Assistant Examiner* — Christopher M Afful
(74) *Attorney, Agent, or Firm* — Muncy, Geissler, Olds & Lowe, P.C.

(57) ABSTRACT

A closure of a tank of a motor vehicle for closing a filler neck gas- and fluid-tight, having a closure fastened to a flap, the flap being fastened to a vehicle body of the motor vehicle such that it is movable into an open or closed position, the closure including a seal, which causes the closure to close against the filler neck. The tank closure should be easy for a user to handle and have a relatively simple design and be economical to manufacture. This is achieved in that the seal is electromechanically or pneumatically adjustable with the aid of an actuator.

9 Claims, 3 Drawing Sheets

(52) U.S. Cl.
CPC ............... *B60K 2015/0507* (2013.01); *B60K 2015/0538* (2013.01)

(58) Field of Classification Search
CPC .... B60K 2015/0461; B60K 2015/0477; B60K 2015/0515
USPC .................. 220/201, 86.2; 141/287, 350
See application file for complete search history.

(56) References Cited

U.S. PATENT DOCUMENTS

| | | | | |
|---|---|---|---|---|
| 5,472,108 | A * | 12/1995 | Skudlarek | B60K 15/05 220/86.2 |
| 5,524,786 | A | 6/1996 | Skudlarek | |
| 6,193,093 | B1 | 2/2001 | Brunner | |
| 6,478,360 | B1 | 11/2002 | Reutter | |
| 7,537,197 | B2 * | 5/2009 | Heim | F16K 99/0001 239/601 |
| 2008/0129046 | A1 * | 6/2008 | Parker | B60K 15/04 285/305 |

FOREIGN PATENT DOCUMENTS

| | | |
|---|---|---|
| EP | 0658484 A1 | 6/1995 |
| WO | WO0029239 A1 | 5/2000 |

OTHER PUBLICATIONS

U.S. Appl. No. 16/135,381, filed Sep. 19, 2018.
U.S. Appl. No. 16/135,426, filed Sep. 19, 2018.

* cited by examiner

TANK CLOSURE

This nonprovisional application claims priority under 35 U.S.C. § 119(a) to German Patent Application No. 10 2017 121 690.1, which was filed in Germany on Sep. 19, 2017, and which is herein incorporated by reference.

BACKGROUND OF THE INVENTION

Field of the Invention

The present invention relates to a closure of a tank of a motor vehicle for closing a filler neck gas- and liquid-tight, comprising a closure fastened to a flap, the flap being fastened to a vehicle body of the motor vehicle such that it is movable into an open or closed position, the closure including a seal, which causes the closure to close against the filler neck.

Description of the Background Art

In most motor vehicles, in particular passenger cars and small trucks, a pivoted flap is introduced into a vehicle body, behind which a filler neck is disposed for a fuel tank. The flap is preferably flush with the vehicle body to avoid disturbing the overall optical impression and the aerodynamics. The filler neck is separately closed in a sealing manner with the aid of a cover; for example, annular disk seals and screw threads or bayonet joints are provided for this purpose. To fuel the motor vehicle, the flap and then the cover must first be opened, and both must be closed again in reverse order after fueling. This is relatively complex. In addition, it is possible to forget to close the cover, and the latter may then get lost.

Methods are known (http://www.spiegel.de/auto/werkstatt/neuer-tankverschluss-wie-in-der-boxengasse-a-216770.html) for designing a closure for a filler neck of a motor vehicle without a cover. For this purpose, a hood made from an elastic material is fastened to the inside of a flap assigned to the filler neck, which is pressed against an area surrounding the filler neck when the flap is closed. In addition, a filling opening is closed with the aid of a spring-loaded sealing flap. The closure does not ensure a complete tightness. In addition, a relatively great contact pressure must be ensured by the flap, so that the entire structure must be designed to be correspondingly stable and heavy.

A closure for a filler neck is disclosed in U.S. Pat. No. 5,234,122 A, in which a cover as the closure may be opened together with an assigned flap with the aid of an electric motor. A very complex mechanism is provided for this purpose, which is made up of many individual parts and is correspondingly expensive to manufacture and mount.

U.S. Pat. No. 5,524,786 A shows a plug-like tank closure, which is detachably fastened to a filler neck, e.g. with the aid of detents. The detents are lockable and unlockable with the aid of an electric drive. During unlocking, a spring presses the tank closure outwardly. A cover, which is flush with a vehicle body when the tank closure is locked, is fastened at the outer longitudinal end thereof. As a result, a flap is not provided. The tank closure is bulky and complex.

A plug-like tank closure is known from EP 658 484 A1, which corresponds to U.S. Pat. No. 5,472,108, which is lockable in a closed and an intermediate position. Opening the tank closure is associated with additional complexity due to the intermediate lock. A flap is not present.

WO 00/29239 A1, which corresponds to U.S. Pat. No. 6,478,360, discloses a closure for a fuel tank, which is fastened to a flap. The closure comprises a cover portion and a plug-like insertion portion. The cover portion is used to seal the fuel tank in connection with a flat seal, and the insertion portion is used to lock the closure in connection with a contact element as well as an undercut formed in a filler neck. The closure is complex.

SUMMARY OF THE INVENTION

It is therefore an object of the present invention to provide a tank closure, which is easy for a user to handle and has a relatively simple design and is economical to manufacture.

The seal can be electromechanically or pneumatically adjustable. The seal may be used, on the one hand, for its actual purpose—namely to close the filler neck gas- and fluid-tight—and, on the other hand, as a lock for preventing unauthorized opening of the closure.

The handling by driver during fueling of a motor vehicle is very easy: He only has to open the flap; the closure is thus removed from the filler neck without any further action, so that a fuel pump nozzle may be inserted. To end the fueling, only the flap needs to be closed after the fuel pump nozzle is removed.

The means for adjusting the seal, i.e. the actuator, are easy and correspondingly economical to manufacture. They comprise, for example, an electric motor, an electromagnetic drive, an electroactive polymer, an electrically influenceable shape memory alloy or an electrically influenceable shape memory polymer. The means are driven, for example with the aid of a switch or a sensor.

The closure may be designed as a cover or as a plug. The seal is fastened to either the closure or the filler neck. The filler neck is manufactured from an elastic and/or rigid material.

The closure can be designed as a cap, which slips over an open end of the filler neck when the flap is closed, the seal being annular and disposed between the cap and the filler neck. The cap covers an upper area of the filler neck, i.e. its open end assigned to a filling opening, when the fuel tank is closed. A length of the cap is dimensioned in such a way that it may be removed from the filler neck without problems upon opening the flap, to which it is preferably fastened in an articulated manner.

The seal can be fastened either on an outer wall of the filler neck or internally on a side wall of the cap in such a way that a secure sealing and clamping is achievable for the closed state when the aforementioned elements interact. A clearance between the plug and the seal is selected to be as small as possible, so that, on the one hand, its placement onto or removal from the filler neck is not disturbed and, on the other hand, the adjustment of the seal for sealing purposes is associated with preferably short distances.

The cap and the seal are easy and light-weight to manufacture and may be assembled with little complexity. The actuator may be easily mounted on the outside of the filler neck or alternatively be integrated into the seal.

The adjustment of the seal can take place by changing a cross section of the filler neck. For this purpose, the filler neck is manufactured from a soft elastic material in the corresponding area. The adjustment may be easily an securely effectuated electromechanically or pneumatically.

The cross section of the filler neck may be reduced in size with respect to a setpoint cross section. The latter is present when the closure is closed and is reduced in size for opening purposes.

The adjustment of the seal can take place by independently changing its shape. The seal is manufactured, e.g. from an electroactive polymer in the manner of an artificial muscle. Although the seal is more complex, its manufacture and assembly are on the whole simplified.

In an embodiment, either the filler neck has a crowning in the area of the filling opening, i.e. in the area of the open end, or the cap has a crowning in the area of its side wall. The crowning improves the sealing action and makes unauthorized opening of the closure more difficult.

The closure can be fastened to the flap in an articulated manner. This makes the closure easier for a user to handle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The first exemplary embodiment illustrated in FIG. 1 relates to a closure of a fuel tank 1 of a motor vehicle, in which a cross section of a filler neck 2 may be reduced from an initial size (zero cross section) to a closing size in an area in which a seal 3 is fastened at least directly to the outside thereof.

Figure 1A:
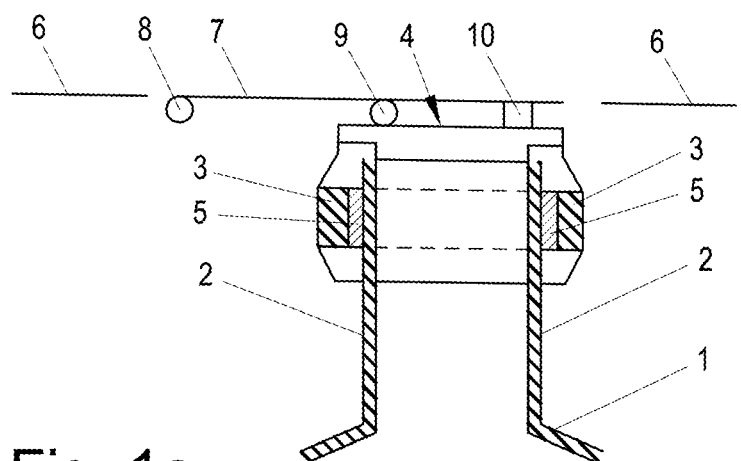
FIGS. 1a and 1b show a cross section of a closure, in which a filler neck, and thus a seal, may be constricted.
Figure 1B:
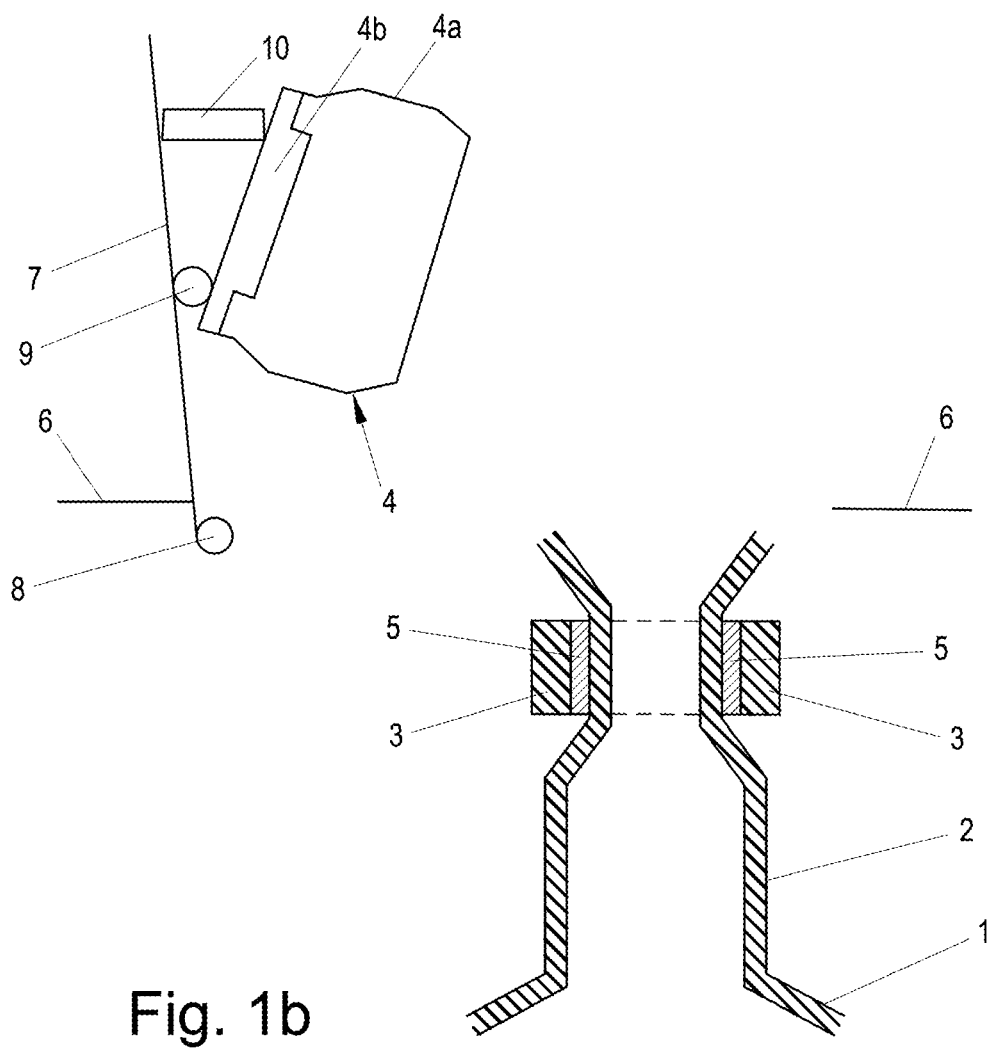

FIG. 1a shows the closure with filler neck 2 in a closed state, and FIG. 1b shows the closure with the filler neck in the open state, i.e. a cap 4 is situated on filler neck 2 or at a distance therefrom.

Filler neck 2 has a circular cross section and is manufactured from an elastically deformable material, such as NBR (nitrile butadiene rubber) or FHP (fluorinated hydrocarbon polymer), at least in an area near an outer, open end.

An annular actuator 5 for the electromechanical adjustment of seal 3 is fastened on the outside of filler neck 2.

Actuator 5 includes, for example, a strap which is wrapped around filler neck 2, and an electric motor or an electromagnetic drive. A first end of the strap is fastened, for example, to a vehicle body 6 of the motor vehicle, and a second end of the strap is operatively connected to the electric motor or the electromagnetic drive in such a way that the wrap radius of the strap may be increased or reduced in size.

Alternatively to the strap and the electric motor or the drive, actuator 5 includes a hose-like structure, which is wrapped around filler neck 2, and a pump having an electric drive.

In another alternative, actuator 5 is formed from an electroactivatable polymer in the manner of an artificial muscle.

All actuators 5 as described above are considered electromechanical or pneumatic within the meaning of this disclosure.

Seal 3 is manufactured from a suitable elastic sealing material such as NBR or FHP in the form of a short tube section and fastened to a portion of actuator 5 surrounding filler neck 2. In the relaxed state, an outer diameter of seal 3 is matched to an inner diameter of cap 4.

Cap 4 is fastened in an articulated manner to a flap 7, which is disposed on vehicle body 6 such that it is pivotable into an open or a closed position with the aid of a hinge 8, for example. The open position of flap 7 corresponds to opened filler neck 2, and the closed position corresponds to closed filler neck 2.

The articulated fastening of cap 4 to flap 7 includes a joint 9 as well as an elastic element 10, in the form of a spring, for example. In this way, it is ensured that cap 4 is largely coaxially aligned with filler neck 2 in the direct vicinity thereof. This prevents a tilting of closure 4 during the opening or closing of the closure.

The closure is designed as cap 4 having a circular cross section. Cap 4 is formed from a wall 4a in the form of a tube piece and a cover 4b. A height of wall 4a is dimensioned in such a way that an open end of filler neck 2 is sufficiently covered, and seal 3 finds sufficient contact surface on cap 4 for sealing purposes when the closure is closed. An end of cap 4 assigned to flap 7 is closed by cover 4b; an end of cap 4 opposite cover 4b is open.

Wall 4a has an outwardly facing, symmetrical crowning over its entire height, i.e. a widening of its cross section whose widest portion is situated at approximately half the height of wall 4a.

An operation of the closure is handled and controlled as follows:

To open the closure, actuator 5 is driven in such a way that the diameter of filler neck 2, which is in the initial size in the area of seal 3 in the closed state, is decreased in size, and the closure, i.e. cap 4, is thereby released for opening. The driving action is activated, for example, by pressing a pushbutton in the interior of the motor vehicle or by pressing flap 7 which actuates a so-called push-push mechanism or a pushbutton for this purpose. Alternatively the driving action is activated with the aid of a sensor, which detects gestures or, upon pressing flap 7, e.g. a change in pressure (e.g. in seal 3) and generates corresponding control signals.

Flap 7 can now be opened manually in the usual manner, a cap 4 being removed from filler neck 2 at the same time. Alternatively, flap 7 is electromotively opened and then closed again later on.

The actual fueling may then begin after inserting a fuel pump nozzle into filler neck 2.

After the fueling is complete, the fuel pump nozzle is removed and flap 7 is closed, cap 4 being simultaneously slipped over filler neck 2. Actuator 5 is driven in such a way that the initial size of filler neck 2, and thus the necessary seal, is reestablished. The driving action is activated either manually, using the means mentioned above for opening, or automatically, e.g. with the aid of a sensor or RFID (radio frequency identification).

Actuator 5 is preferably deenergized when the closure is closed.

The second exemplary embodiment illustrated in FIG. 2 relates to the closure of fuel tank 1, in which seal 3 is simultaneously designed as actuator 5, and whose cross section may be reduced from an initial size (for the closed closure) to an open size. The cross section is related to a direction radially to the longitudinal axis of filler neck 2.

Figure 2A:
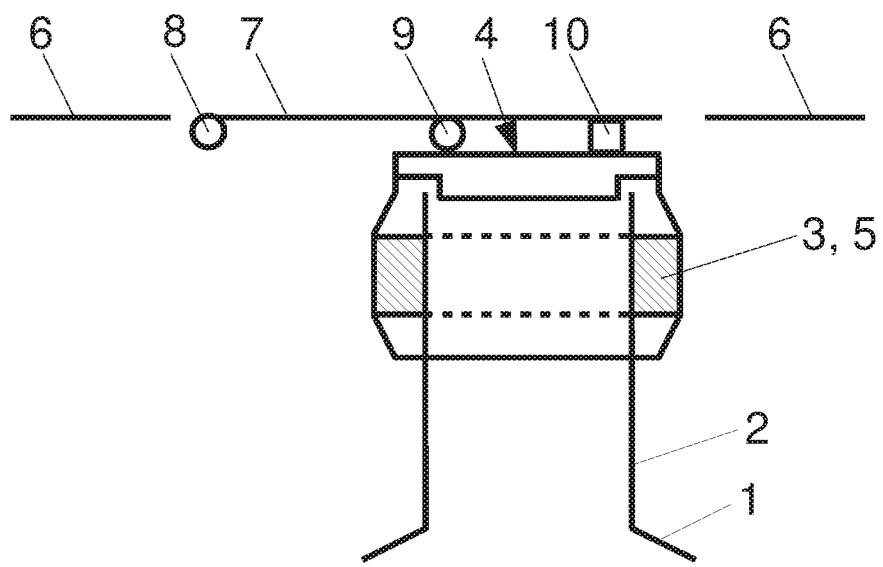
FIGS. 2a and 2b show a cross section of a closure, in which a seal is fastened on the outside of a filler neck and is independently variable in its shape.
Figure 2B:
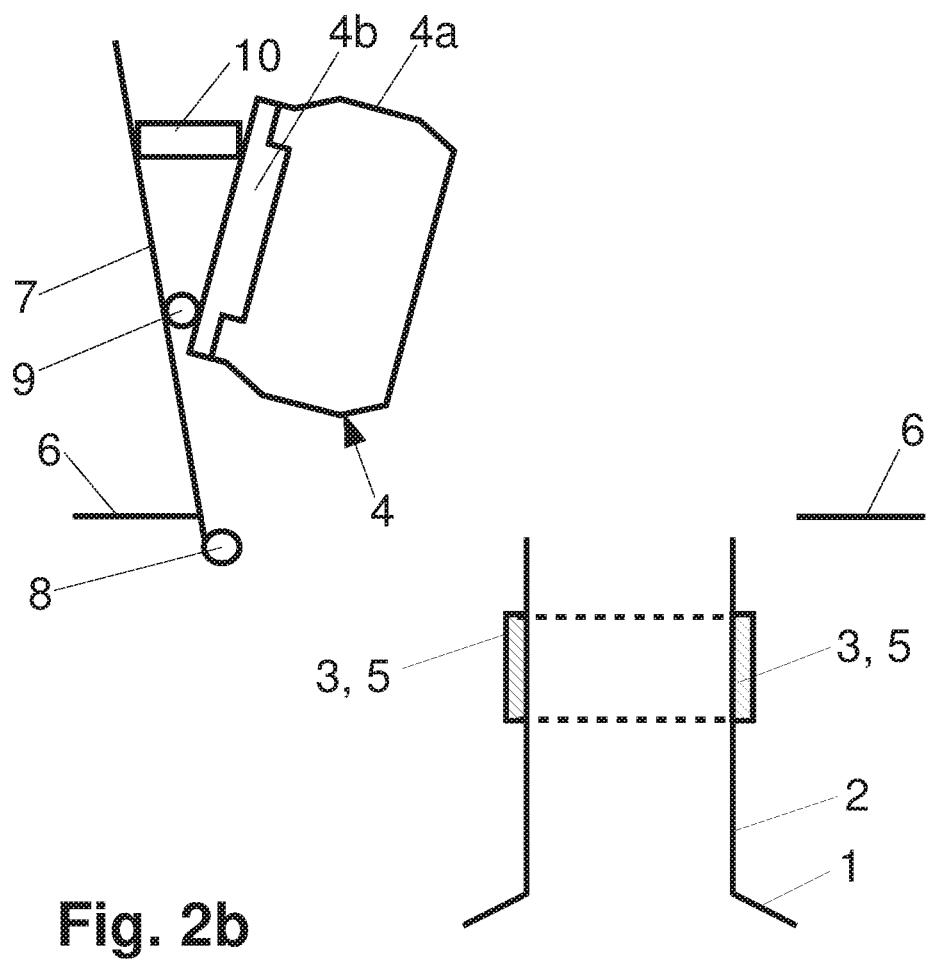

FIG. 2a shows the closure with filler neck 2 in the closed state and FIG. 2b shows the closure with the filler neck in the open state, i.e. cap 4 is situated in filler neck 2 or at a distance therefrom.

The second exemplary embodiment also differs from the first exemplary embodiment as follows:

Seal 3 is designed as actuator 5 and to be actively deformable in and of itself. This means that the adjustment of seal 3 takes place by independently changing its shape. Seal 3 is manufactured for this purpose in the manner of an electric muscle in such a way that it reduces the size of its cross section upon the application of an electric voltage, i.e. an outer diameter of seal 3 is reduced in size upon the application of the electric voltage.

Seal 3, and thus also actuator 5, is fastened directly on the outside of filler neck 2 in an area near the filling opening. It is formed from an electroactivatable polymer.

Filler neck 2 is manufactured entirely from a hard material.

In the relaxed state, an outer diameter of seal 3 is matched to the inner diameter of cap 4 in the area of the crowning. In the relaxed state, the outer diameter of seal 3 is greatly reduced in size therefrom, so that cap 4 may be easily removed from filler neck 2.

Otherwise, the second exemplary embodiment matches the first exemplary embodiment.

The operation and control are largely similar to the description of the first exemplary embodiment, with the difference that seal 3 is driven directly as actuator 5. To open the closure, the cross section of seal 3 is reduced in size in such a way that cap 4 may be removed from filler neck 2 without problems. After flap 7 is closed, and cap 4 is thus placed onto filler neck 2, the cross section of seal 3 is again increased to the initial size.

Like the second exemplary embodiment, the third exemplary embodiment illustrated in FIG. 3 relates to a closure of a fuel tank 1 of a motor vehicle, in which a cross section of seal 3, which is fastened to an inside of filler neck 2, may be decreased from an initial size (for the closed closure) to an open size. The cross section is related to a direction radially to the longitudinal axis of filler neck 2.

Figure 3A:
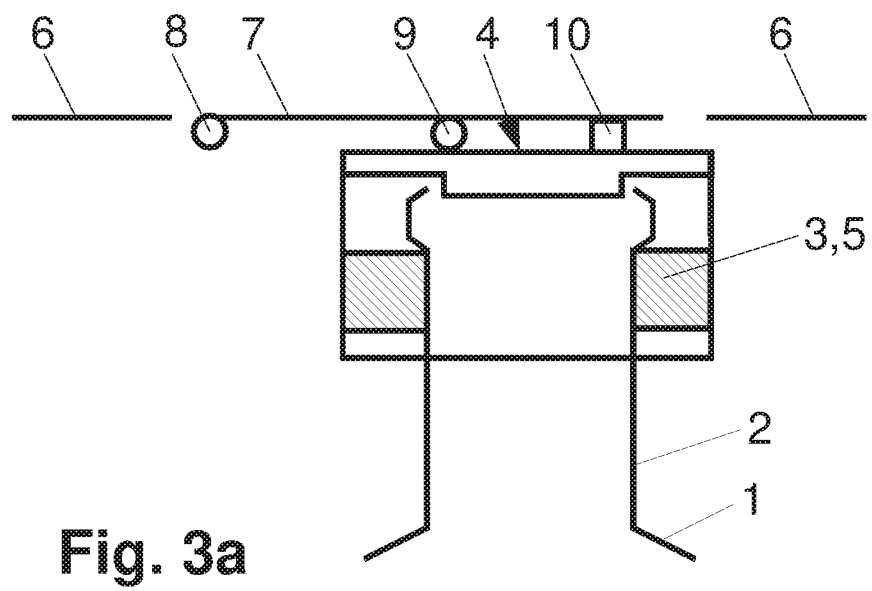
FIGS. 3a and 3b show a cross section of a closure, in which a seal is fastened on the inside of a cap and is independently variable in its shape.
Figure 3B:
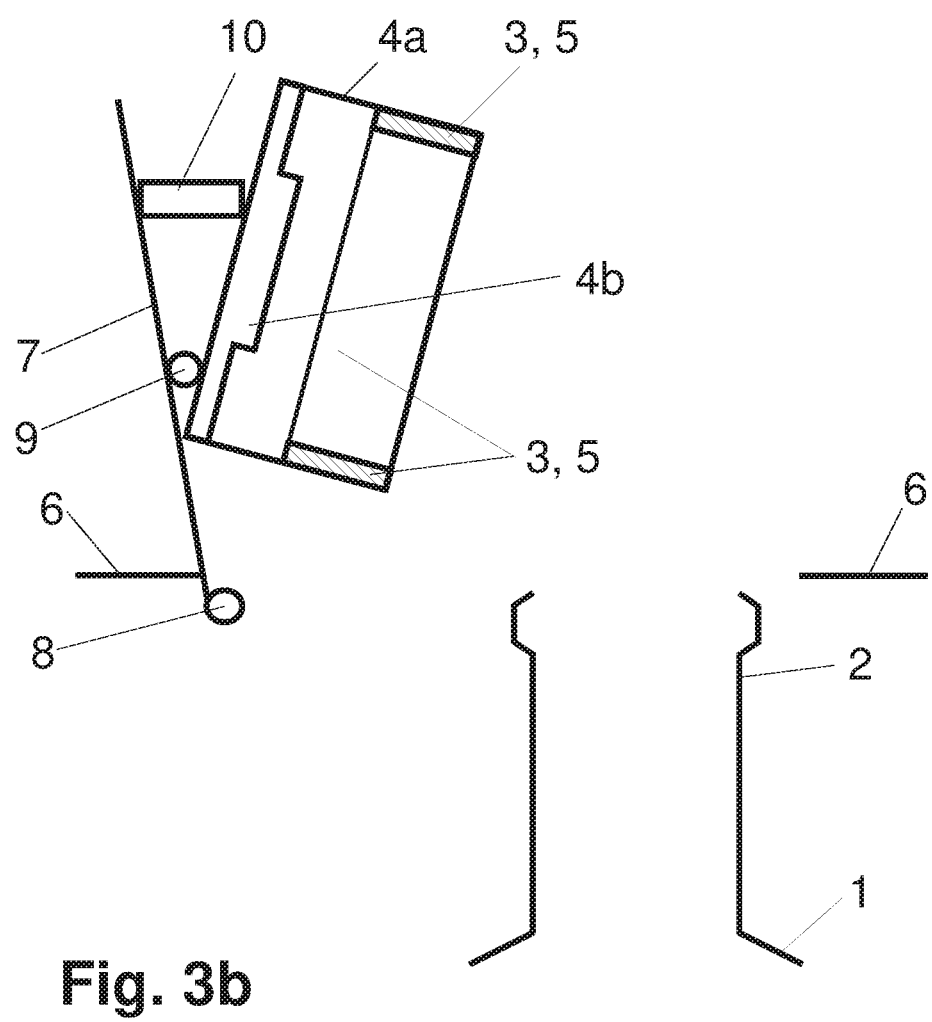

FIG. 3a shows the closure with filler neck 2 in the closed state and FIG. 3b shows the closure with the filler neck in the open state, i.e. a closure 4 is situated on filler neck 2 or at a distance therefrom.

The third exemplary embodiment also differs from the first exemplary embodiment as follows:

Cap 4 is manufactured without the crowning of wall 4a. The cross section of wall 4a is thus straight.

Instead, filler neck 2 has an outwardly facing crowning in its area near the open end, which largely corresponds to the crowing of cap 4 in the first two exemplary embodiments.

Seal 3 is fastened to an inside of wall 4a of cap 4 in such a way that it is disposed beneath, i.e., an end of the crowning situated at a distance from the open end of filler neck 2, when the closure is closed.

Otherwise, the third exemplary embodiment matches the second exemplary embodiment.

The operation and control take place similarly to the description of the second exemplary embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closure component for a tank of a motor vehicle for closing a filler neck gas- and fluid-tight, the closure component comprising: a closure fastened to a flap, the flap being fastened to a vehicle body of the motor vehicle such that the flap and the closure are movable into an open position or a closed position, a seal, which causes the closure to be retained against the filler neck when the closure is in the closed position, wherein the seal is electromechanically or pneumatically adjustable with the aid of an actuator, wherein the seal has an annular, ring shape with a central opening, and wherein, when the closure is in the closed position, a portion of the filler neck is inserted through the central opening of the seal, wherein the adjustment of the seal takes place by changing a cross section of the filler neck, such that when the closure is in the open position, the cross section of the filler neck is smaller than when the closure is in the closed position, wherein the seal remains connected to the filler neck when the closure is in the open state.

2. The closure component according to claim 1, wherein the closure is a cap, which slips over an open end of the filler neck when the flap is in the closed position, the seal being and disposed between the cap and the filler neck.

3. The closure component according to claim 1, wherein the adjustment of the seal takes place by independently changing a size of the seal, such that when the closure is in the open position, the size of the seal is smaller than when the closure is in the closed position.

4. The closure component according to claim 3, wherein the filler neck has a crowning in an area of an open end.

5. The closure component according to claim 4, wherein the seal is adjusted between an open state in which the closure is movable from the closed position to the open position and a closed state in which the closure is inhibited from moving from the closed position to the open position,
wherein the crowning of the filler neck is formed by a portion of an exterior side surface of the filler neck that protrudes outwardly,
wherein when the closure is in the closed state and the seal is in the closed state, a contact between the crowning of the filler neck and the seal blocks the closure from moving from the closed position to the open position, and
wherein when the seal is in the closed state, a size of the seal is larger than when the seal is in the open state.

6. The closure component according to claim 3, wherein the seal remains connected to an interior surface of the closure when the closure is in the open state.

7. The closure component according to claim 1, wherein an area of a side wall of the cap has a crowning.

8. The closure component according to claim 1, wherein the closure is fastened to the flap in an articulated manner.

9. The closure component according to claim 1, wherein the closure is fastened to the flap by a pivot joint, such that the closure is pivotable with respect to the flap.

* * * * *